United States Patent Office
3,390,307
Patented June 25, 1968

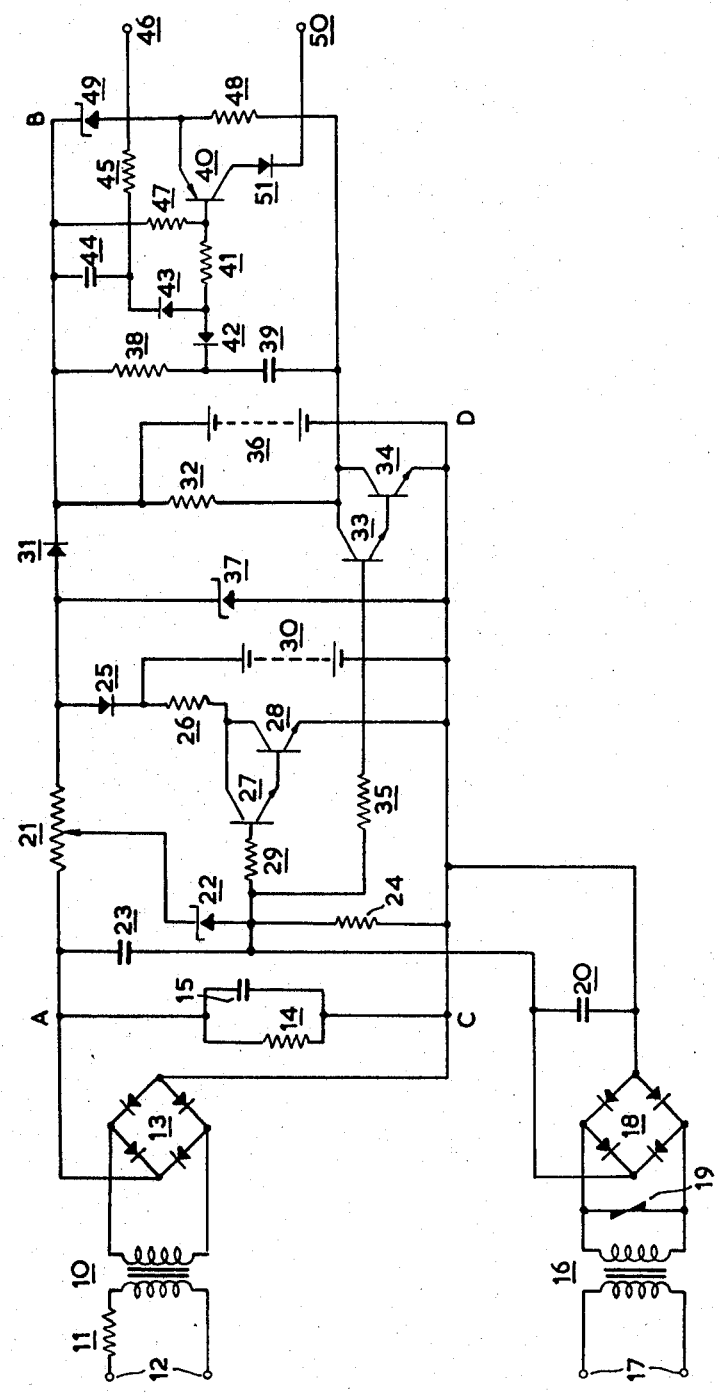

3,390,307
ELECTRICAL RELAYS
Eric Paddison, David Clegg, and Robin Howard John Warren, Safford, England, assignors to The English Electric Company Limited, London, England, a British company
Filed Aug. 30, 1965, Ser. No. 483,524
Claims priority, application Great Britain, Sept. 16, 1964, 37,916/64
6 Claims. (Cl. 317—33)

ABSTRACT OF THE DISCLOSURE

This invention relates to an electrical power supply circuit for energising in a protective relay monitoring means which are operative to monitor electrical conditions, e.g. voltage and current, existing in an electrical system and to evaluate from these quantities control signals for effecting protective action. The monitoring means, which may conveniently be distance-to-fault measuring circuits, are supplied with power for their operation by the input signals to the relay itself when these exceed a predetermined magnitude and from a stand-by battery (normally charged by these input signals) during periods for which the input signals lie below this magnitude. Thus, two power supplies are provided in effect, and the advantage of having these two supplies available at the same time is that each may have a smaller electrical "capacity" than if only one were available. For example, power for the measuring circuits is normally provided by the protected system but in the event of there being a sudden increase in the power required, e.g. to initiate a circuit-breaker tripping signal, then this increase is provided in part by the battery whereas without the battery the additional power requirement would result in a sudden drop in the supply voltage which would consequently disturb the measuring function. The battery is always in its "standby" condition and is yet not permitted to discharge during its out-of-service periods.

---

The invention relates to power supply circuits.

According to the invention such a supply circuit for energising an electrical monitoring means of an electrical protective relay whereby to enable the relay to respond to monitor conditions in an electrical system to be protected by the relay, comprises input means for receiving at least one input signal dependent on one of the said conditions to be monitored and for producing in response thereto a direct current signal, the direct current signal being itself derived from the said input signal, an electrical circuit for receiving this direct current signal and comprising in series connection, the said monitoring means and switching means, which switching means is controlled in dependence upon the magnitude of the direct current signal, and a battery connected in parallel with the said electrical circuit for supplying power to that circuit and for receiving as a charging current a current derived from the said input signal whenever the said direct current signal exceeds a predetermined high value.

According to a feature of the invention the supply circuit may include a unidirectional conducting device connected between the said electrical circuit and the input means for preventing a discharge of the battery through the input circuit means.

According to another feature of the invention the switching means may comprise semi-conductor means for receiving the said direct current signal and arranged to change from a non-conducting state to a conducting state whenever that signal exceeds a predetermined low value.

According to another feature of the invention the input circuit may include first input means for receiving a first signal proportional to the current in the said system and for producing in response thereto a first direct current signal, and second input means for receiving a signal proportional to the voltage in the system and for producing in response thereto a second direct current signal, and means for combining the first and second direct current signals to produce the said direct current signal.

According to another feature of the invention a non-linear voltage sensitive device may be connected between the said second input means and the said switching means for isolating the switching means from the said second direct current signal until that signal has exceeded a predetermined intermediate value, so that the switching means is not rendered conductive due to the second input signal until that signal has exceeded the said predetermined intermediate value.

A power supply circuit according to the invention for an electrical distance protection relay will now be described by way of example and with reference to an accompanying drawing which shows diagrammatically the principal circuit connections of the power supply circuit.

Referring now to the drawing, an input transformer 10 has a primary winding connected in series with a resistor 11 to input terminals 12 and a secondary winding connected across a full-wave rectifier network 13. The D.C. circuit of rectifier network is connected between lines AB and CD. A resistor 14 and a capacitor 15 are connected between the lines AB and CD at A and C.

An input transformer 16 has a primary winding connected across input terminals 17 and a secondary winding connected across a full-wave rectifying network 18. A voltage limiting non-linear resistor 19 is connected across the A.C. circuit of the rectifier network 18. A capacitor 20 is connected across the D.C. circuit of the rectifier network 18.

The positive pole of the D.C. circuit of the rectifier network 13 is connected to a potentiometer 21 in the line AB and a tapping of that potentiometer is connected in series with a Zener diode 22 to the positive pole of the D.C. circuit of the rectifier network 18. A stabilising capacitor 23 is connected to the positive pole of the rectifier network 18 and the line AB between the potentiometer 21 and A. The negative poles of the D.C. circuits of the rectifier networks 13 and 18 are connected to the line CD. A resistor 24 is connected to the junction between the positive pole of the rectifier network 18 and capacitor 23 and the line CD.

Connected to the remote end of the potentiometer 21 is a diode 25 arranged to allow a current to flow in a direction away from the potentiometer 21 to a resistor 26 which is connected to the collectors of transistors 27 and 28. The base of the transistor 27 is connected by a resistor 29 to the positive pole of the rectifier circuit 18. The emitter of the transistor 28 is connected to the line CD and the base of the transistor 28 is connected to the emitter of the transistor 27. A battery 30 has a positive terminal connected between the diode 25 and the resistor 26 and a negative terminal connected to the line CD.

A diode 31 connected in the line AB at the remote end of the potentiometer 21 is arranged to allow a current to flow away from the potentiometer 21 to a resistor 32 which is connected to the collectors of transistors 33 and 34. The base of the transistor 33 is connected by a resistor 35 to the positive pole of the rectifier network 18. The emitter of the transistor 34 is connected to the line CD and the base of the transistor 34 is connected to the emitter of the transistor 33. A battery 36 has a positive terminal connected between the diode 31 and the resistor 32 and a negative terminal connected to the line CD. A Zener diode 37 is connected to limit the voltage developed between the diodes 25 and 31 to the line CD.

A safety circuit includes a resistor 38 connected in series with a capacitor 39 between the line AB beyond the diode 31 from A and the collector of the transistor 34. A transistor 40 has its base connected through a resistor 41 to a diode 42 which is connected to the junction between the resistor 38 and the capacitor 39 in such a way as to allow a current to flow away from the transistor 40. A diode 43 connected to the junction between the resistor 41 and the diode 42 will allow current to flow to a capacitor 44 which is connected to the line AB adjacent to B and to a resistor 45 which is connected to a first output terminal 46. A stabilising resistor 47 is connected between the line AB adjacent to B and the base of the transistor 40. A resistor 48 is connected between the collector of the transistor 34 and the emitter of the transistor 40. A Zener diode 49 is connected to the line AB at the point B and the emitter of the transistor 40. The collector of the transistor 40 is connected to a second output terminal 50 by a diode 51 allowing current to flow towards the terminal 50.

The operation of the circuit will now be described. The terminals 12 are supplied by a voltage signal proportional to the voltage of the power line to be protected by the relay and the terminals 17 are supplied with a current signal proportional to the current flowing in the power line.

The measuring circuits and supervisory circuits of the relay are not shown in detail but they are connected as the collector load of transistors 28 and 32, respectively, and the resistance offered by these circuits is represented by the resistors 26 and 32 in the drawing. Transistors 27 and 28 on the one hand, and transistors 33 and 34 on the other are arranged to act as switches to control the supply of D.C. power to the measuring and supervisory circuits. The operation of the two transistor switches is similar so the action of transistors 27 and 28 will only be described.

Whenever a current signal above a predetermined low value is applied at terminals 17, a current flows in the resistor 24 which raises the potential of the base of the transistor 27 so that this transistor together with transistor 28 changes to the conducting state. In this event power is supplied to the measuring circuits 26 either from the battery 30 or from the voltage on diode 25 if this is greater, this voltage being substantially the same as that developed across resistor 24, the forward resistance of Zener diode 22 and the resistance of potentiometer 21 being small. With the voltage source being supplied through diode 25 in this manner the battery 30 is charged as before.

Whenever a voltage signal is applied to the terminals 12, in the absence of current signals, the action of the circuit is similar to that described above except that the Zener diode 22 prevents a current flowing in resistor 24 until the voltage signal is greater than a predetermined intermediate value. The Zener diode 22 is normally arranged to prevent a flow of current until the voltage signal presents a voltage in the power line of 80% of normal voltage. In this way the action of the Zener diode 22 ensures that the transistors 27 and 28 are not switched to a conducting state unless the voltage signal is great enough to charge the battery.

It will be appreciated that any number of batteries and loads may be suitably connected to the input transformers 10 and 16. It is often advantageous to have one battery supply for each of the relay circuits, such as 26 and 32, so that relay measuring circuits 26 may be supplied independently of supervisory circuits 32. Some error of measurement may otherwise result at the instant a supervisory operation is initiated.

The operation of the safety circuit, which decreases the relay operating time when the power line having an electrical fault at, or near, the relay point is connected for energisation by a power supply source will now be described. Whenever the power supply circuit is energised an initial charging current passes through the resistor 38 to charge up the capacitor 39; this allows a base current to flow in the transistor 40 to maintain the transistor 40 in a conducting state. The terminal 50 is connected through relay contacts (not shown) to the line CD, and during faulty conditions these relay contacts are closed so that a current will flow from the line AB through the transistor 40 and the relay contacts to the line CD. This current is arranged to energise a timer transistor, for example, in the final stage of a timing device such a transistor when energised allowing the flow of a tripping current in a circuit-breaker tripping coil to isolate the faulty power-line from the power supply source without delay. A holding current is arranged to flow from the line AB through the transistor 40, the resistor 41, the diode 43 and the resistor 45 to the terminal 46. This holding current flows as soon as the capacitor 44 has charged up and flows through the timer transistor in the timing device which carries the said tripping current so as to maintain the timer transistor in a conducting state. The delay in charging the capacitor 44 prevents the holding current being initiated by spurious signals. It will be appreciated that when there is no fault in the system the relay contacts are open so that no current may flow from the line AB to the line CD through the transistor 40 to energise the timer transistor.

The invention provides a power supply circuit for providing power to relay circuits and also for charging a battery. The batteries supply power to the relay circuits under circumstances when the said direct current voltage falls below the potential of the battery, but not below a predetermined intermediate or low value as the case may be, and serves at the same time to increase the "electrical capacity" of the power available to the relay circuits at any instant and particularly during periods when the relay circuits are initiating relay operations which may require sudden impulses of power.

What we claim as our invention and desire to secure by Letters Patent is:

1. An electrical power supply circuit for providing, in a protective relay, a power supply for monitoring means which are operative to evaluate conditions existing in an electrical system to be protected by the relay, comprising
    input means for receiving an input signal dependent on the said conditions and to which the monitoring means is responsive for its evaluation and deriving a D.C. voltage signal from, and proportional to, the said input signal,
    a control circuit for receiving this D.C. voltage signal,
    a unidirectionally conducting device connected between said control circuit and the input means and
    a battery connected in parallel with the control circuit, said control circuit comprising
    switching means connected in series with said monitoring means, the conductive state of the switching means being controlled by the D.C. voltage signal to permit power to be supplied through the unidirectionally conducting device to the monitoring means by that signal and said battery to be charged thereby whenever the magnitude of the signal exceeds a predetermined value greater than the battery voltage, and to permit said battery to supply power to said control circuit whenever the signal falls to a finite magnitude below that value or the power demanded by the relay exceeds the capacity available from said input signal.

2. A power supply circuit according to claim 1, wherein the input means comprises,
    a first input circuit for receiving a signal proportional to the current in said system
    a second input circuit for receiving a signal proportional to the voltage of said system and
    circuit means for commonly receiving the signals from the first and second input circuits whereby the said D.C. voltage signal is dependent on the signals received by both the first and the second input circuits.

3. A power supply circuit according to claim 2, wherein the circuit means comprises
   a Zener diode for isolating from the switching means the said signal from the second input circuit whilst its magnitude lies below a predetermined intermediate value, whereby the switching means is rendered non-conductive in response to that signal alone until it exceeds the intermediate value.

4. A power supply circuit according to claim 3, comprising
   a protective circuit for instantaneously effecting protective action whenever a fault condition is realised in said system at or near the relay location, comprising
   an auxiliary switch operable, without delay, to initiate said protective action in response to the existence of said input signal whenever the said fault condition is realised, and
   a latching circuit for developing a hold-in current from said battery for the auxiliary switch.

5. A power supply circuit according to claim 4, wherein said protective circuit further comprises
   capacitive storage means for delaying for a predetermined period the development of said hold-in current by the latching circuit for preventing operation thereof in response to spurious input signals.

6. An electrical power supply circuit for providing, in a protective relay, a power supply for monitoring means which are operative to evaluate from voltage and current signals conditions existing in an electrical system protected by the relay, comprising
   a first input circuit for receiving a signal proportional to the current in said system and deriving a first direct voltage therefrom,
   a second input circuit for receiving a signal proportional to the voltage in said system and deriving a second direct voltage therefrom,
   circuit means common to said first and second input circuits,
   a unidirectionally conducting device,
   a control circuit connected to the circuit means via said unidirectionally conducting device and having impressed thereacross a D.C. voltage signal dependent on both the first and second voltages, and
   a storage battery connected in parallel with the control circuit, said control circuit comprising
   switching means connected in series with said monitoring means and connected in addition to the circuit means to receive a proportion of the said D.C. voltage signal, the conductive state of the switching means being controlled by that signal to permit power to be supplied to the monitoring means from the said D.C. voltage signal impressed across the control means and said battery to be charged thereby whenever the latter signal exceeds a predetermined value greater than the battery voltage, and to permit said battery to supply power to said control circuit whenever the signal falls to a finite magnitude below that value or the power demanded by the relay exceeds the capacity available from said input signal.

References Cited

UNITED STATES PATENTS

| | | | |
|---|---|---|---|
| 3,116,439 | 12/1963 | Riebs | 317—22 |
| 3,123,759 | 3/1964 | Grey | 320—40 |
| 3,152,298 | 10/1964 | Byles | 322—73 |
| 3,160,788 | 12/1964 | Antoszewski et al. | 317—33 X |
| 3,189,788 | 6/1965 | Cady. | |

MILTON O. HIRSHFIELD, *Primary Examiner.*

J. D. TRAMMELL, *Assistant Examiner.*